United States Patent [19]
Pilukaitis et al.

[11] Patent Number: 5,926,383
[45] Date of Patent: Jul. 20, 1999

[54] INTEGRATED PROTECTION CIRCUIT FOR A POWER CONVERTER AND METHOD OF OPERATION THEREOF

[75] Inventors: Raymond W. Pilukaitis, Garland; Ning Sun, Plano, both of Tex.

[73] Assignee: Lucent Technologies Inc., Murray Hill, N.J.

[21] Appl. No.: 09/045,425

[22] Filed: Mar. 20, 1998

[51] Int. Cl.⁶ .............................. H02M 7/10; H02H 7/00
[52] U.S. Cl. ................................. 363/50; 361/18
[58] Field of Search ................... 363/50, 52, 53, 363/55, 56; 361/18, 79, 86, 87, 92

[56] References Cited

U.S. PATENT DOCUMENTS

| | | | |
|---|---|---|---|
| 4,447,841 | 5/1984 | Kent | 361/18 |
| 4,872,100 | 10/1989 | Diaz | 363/41 |
| 5,424,897 | 6/1995 | Mietus et al. | 361/91 |
| 5,757,635 | 5/1998 | Seong | 363/89 |

*Primary Examiner*—Matthew Nguyen

[57] ABSTRACT

For use with a controller, couplable to a network of first and second comparators, that disables a power converter an actual output current thereof exceeds a threshold output current, an integrated protection circuit and method of operating the same. In one embodiment, the integrated protection circuit includes: (1) a sensor that senses an actual input voltage of the power converter and (2) an isolation circuit, coupled to the first comparator, that selectively decouples the first comparator from the controller, the second comparator causing the controller to disable the power converter when the actual input voltage falls below a threshold input voltage thereby allowing the protection circuit to provide both overcurrent and undervoltage protection.

21 Claims, 4 Drawing Sheets

INTEGRATED PROTECTION CIRCUIT FOR A POWER CONVERTER AND METHOD OF OPERATION THEREOF

TECHNICAL FIELD OF THE INVENTION

The present invention is directed, in general, to power conversion and, more specifically, to an integrated protection circuit for a power converter and method of operation thereof.

BACKGROUND OF THE INVENTION

Overcurrent, undervoltage and overvoltage protection circuits have been separately used for power supplies for more than a decade. Each protection circuit has its own merits and limitations, such as function, cost and number of components. The advantages of the overcurrent protection circuits are that they are very simple, can completely shut-off the power supply (e.g., a power converter) and will remain off until the overcurrent condition is removed and input power is recycled. The function is desirable to protect the power supply from internal or external component failure and to prevent excessive heating in those failed components.

The undervoltage lockout function is either provided by a dedicated undervoltage circuit or by a pulse width modulation (PWM) integrated circuit (IC) controller. In either case, as the input voltage of the power converter increases from zero, the undervoltage lockout function will keep the power converter off until the input voltage rises to a predetermined level. Subsequently, as the input voltage drops from a normal operating input voltage to zero volts, the undervoltage lockout circuit will turn the power converter off when the input voltage falls below a predetermined threshold.

The undervoltage lockout function is desirable since the input current to the power converter tends to increase as the input voltage decreases. This function can effectively limit that current. Further, the undervoltage lockout function can prevent voltage drop and overcurrent shutdown in circuits with maximum duty cycle limiting. As the input voltage is lowered, the duty cycle increases, eventually reaching its maximum, causing the output voltage to fall out of regulation.

Unfortunately, some types of overcurrent protection circuits interpret this as an overcurrent condition and will latch the power supply off until the input power is recycled. As a result, the power supply could latch off or have low output voltage during various input voltage conditions, such as slowly rising input voltage or momentary input voltage loss.

An example of circuits that provide overvoltage protection is overvoltage clamping circuits. Overvoltage clamping circuits function in a number of different fashions. In one instance, a sensor detects a higher than expected voltage at the output of a power converter and a portion of the overvoltage clamp circuit clamps the output at a maximum voltage. Once clamped, the overvoltage clamp circuit continues to hold the output voltage at the clamped value, only allowing the voltage to drop, not rise any higher. Additionally, some circuits also have overvoltage shutdown abilities. If so, another portion of the overvoltage circuit eventually forces the power converter to shut down if the overvoltage condition persists thereby protecting the power converter and/or its load from damage due to high voltage levels.

An example of a power converter requiring the aforementioned protection functions is hereinafter described. For some power supply applications, a controller that limits a duty cycle of the switching devices of the power converter to fifty percent is desirable. The switching devices such as the metal-oxide semiconductor field-effect transistors (MOSFETs) and Schottky diodes of a resonant reset forward converter, for instance, may suffer very high voltage stresses during the start-up process and other transient conditions. The high voltage stresses are a result of the large duty cycle (e.g., eighty-five percent) imposed on the switching devices of the power converter. Consequently, very little time in one cycle remains to reset the transformer and, therefore, the voltages of the transformer, MOSFET and diodes have to be extremely high to reset the transformer. The high voltage stresses often contribute to the failure of the MOSFETs and diodes. To eliminate this problem, a controller (e.g., a PWM IC) that limits the duty cycle of the switches to about fifty percent is employed for a forward converter with resonant reset. Further, when using peak current control converters, a lower maximum duty cycle is desired since these converters are known to have inherent instabilities where duty cycles of greater than fifty percent are employed.

Accordingly, what is needed in the art is a recognition that merging protection functions for a power converter is advantageous and, what is further needed in the art, is a circuit that combines at least overcurrent and undervoltage protections in an integrated fashion.

SUMMARY OF THE INVENTION

To address the above-discussed deficiencies of the prior art, the present invention provides for use with a controller, couplable to a network of first and second comparators, that disables a power converter an actual output current thereof exceeds a threshold output current, an integrated protection circuit and method of operating the same. In one embodiment, the integrated protection circuit includes: (1) a sensor that senses an actual input voltage of the power converter and (2) an isolation circuit, coupled to the first comparator, that selectively decouples the first comparator from the second comparator, the second comparator causing the controller to disable the power converter when the actual input voltage falls below a threshold input voltage thereby allowing the protection circuit to provide both overcurrent and undervoltage protection.

The present invention, therefore, introduces the broad concept of combining the overcurrent and undervoltage protection functions in an integrated circuit. To accomplish the aforementioned functions, the first and second comparators cooperate to provide overcurrent protection and the sensor and the second comparator cooperate to provide undervoltage protection. The isolation circuit disengages the first comparator from the second comparator when the actual input voltage falls below the threshold voltage.

In one embodiment of the present invention, the protection circuit further includes a voltage clamp that temporarily clamps an output voltage of the power converter at an upper limit, the overcurrent protection circuit subsequently causing the controller to disable the power converter. In addition to overcurrent and undervoltage protection, the protection circuit is also capable of providing overvoltage protection thereby providing three levels of protection for the power converter in a single integrated circuit.

In one embodiment of the present invention, the threshold input voltage is partially derived from a reference voltage coupled through a resistor to an input of the second comparator. In this embodiment, the threshold input voltage is derived from the reference voltage and a voltage sensed by the sensor.

In one embodiment of the present invention, the sensor includes a resistor divider network. Those skilled in the art are familiar with resistor divider networks and the advantages associated therewith. The resistor values are user selectable to partially define the threshold input voltage depending on the specific application.

In one embodiment of the present invention, the protection circuit further includes a clamp circuit that is capable of clamping a voltage at an input of the second comparator. In an embodiment to be illustrated and described, the clamp circuit is coupled to a node between first and second resistors of the resistor divider network. The present scope of the present invention, however, is not limited to sensors employing resistor divider networks.

In one embodiment of the present invention, the isolation circuit includes a diode. In an embodiment to be illustrated and described, the diode isolates the overcurrent and undervoltage protection functions under certain conditions. Of course, other isolation circuits are well within the broad scope of the present invention.

In one embodiment of the present invention, the network further includes a capacitor and a switch. In an embodiment to be illustrated and described, the capacitor and switch cooperate with the first and second comparators to cause the controller to disable the converter during an overcurrent condition. Of course, circuit parameter variations that achieve analogous functionality are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
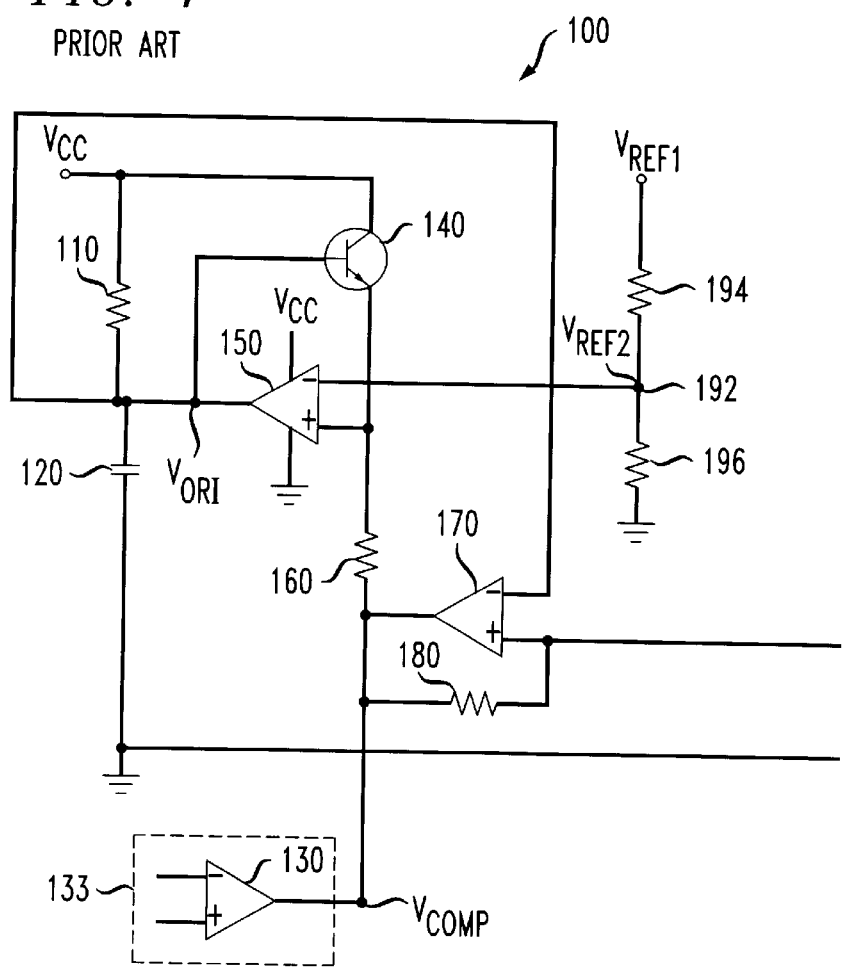
FIG. 1 illustrates a schematic diagram of a prior art overcurrent protection circuit.

Referring initially to FIG. 1, illustrated is a schematic diagram of a prior art overcurrent protection circuit 100. The overcurrent protection circuit 100 consists of a first resistor 110 coupled between a capacitor 120 and a transistor 140. The transistor 140 is further coupled across a noninverting input and an output of a first comparator 150 (an operational amplifier) thereby forming a positive feedback loop. First and second divider resistors 194, 196 are coupled to the inverting input of the first comparator 150 from a node 192. A secondary reference voltage $V_{ref2}$ is generated at the node 192 located between the series-coupled first and second divider resistors 194, 196.

A second resistor 160 is coupled between the output of a second comparator 170 (an operational amplifier), which is only capable of sinking current, and the noninverting input of the first comparator 150. The second resistor 160 is additionally coupled to the output of a controller operational amplifier 130 that is located in a PWM controller 133. A feedback resistor 180 is coupled between a noninverting input and an output of the second comparator 170.

A controller output voltage $V_{comp}$ normally operates between 1 V to 4 V. A power supply coupled to the PWM controller 133 is operated in a peak current or duty cycle control mode of operation whereby the PWM controller 133 regulates the output voltage of the power supply from light load to full load current by increasing or decreasing $V_{comp}$, which correspondingly increases or decreases the duty cycle or peak current. If an overcurrent condition that exceeds a predetermined threshold exists, the output voltage falls out of regulation and the output of the controller operational amplifier 130 will saturate high (approximately 5 V).

The secondary reference voltage $V_{ref2}$, which is normally higher than the controller output voltage $V_{comp}$, is measured from the first and second divider resistors 194, 196. During normal operation, the first comparator output voltage $V_{oa1}$ is pulled down to near zero as the controller output voltage $V_{comp}$ is lower than the secondary reference voltage $V_{ref2}$. During an overcurrent condition, the controller output voltage $V_{comp}$ exceeds the secondary reference voltage $V_{ref2}$ and the first comparator output voltage $V_{oa1}$ will rise to a bias supply voltage $V_{cc}$ of the control operational amplifier 130. Since the output of the first comparator 150 is an open-collector output, the capacitor 120 will be charged to the supply voltage $V_{cc}$ through a first resistor 110. The transistor 140 provides positive feedback to the first comparator 150 input and causes the first comparator 150 to be latched high. With the first comparator 150 latched high, the PWM controller 133 will be disabled (thereby disabling the power supply) until the overcurrent condition is removed and the input voltage is reapplied.

Figure 2:
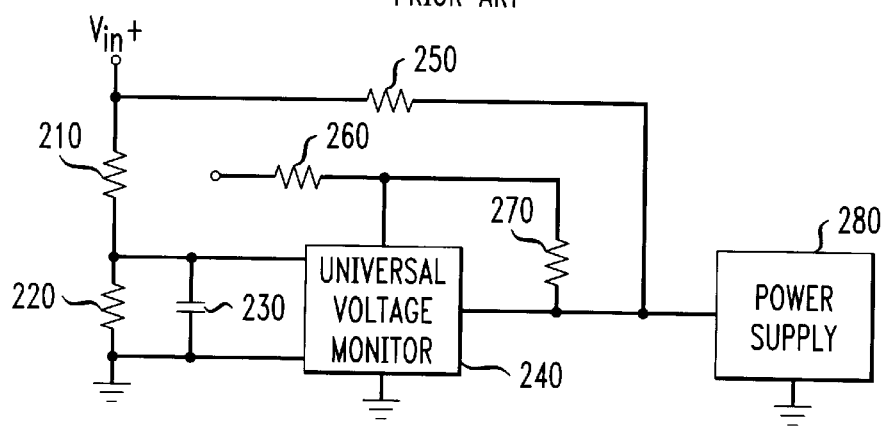
FIG. 2 illustrates a schematic diagram of a prior art undervoltage lockout circuit.

Turning now to FIG. 2, illustrated is a schematic diagram of a prior art undervoltage lockout circuit 200. The circuit 200 consists of a first resistor 210 coupled to a second resistor 220 that is in turn coupled in parallel with a capacitor 230. The capacitor 230 is coupled to a first and second input of a universal voltage monitor (UVM) 240, which monitors undervoltage conditions. A third resistor 250 is coupled between the first resistor 210 and the output of the UVM 240. A fourth resistor 260 is coupled to a third input of the UVM 240 and a fifth resistor 270 is coupled between the fourth resistor 260 and the output of the UVM 240. Finally, the output of the UVM 240 is coupled to a power supply 280.

An input voltage $V_{in}$ is sensed and then compared to a reference voltage. The output of the UVM 240 will be zero when the input voltage $V_{in}$ is lower than a reference voltage. Once the output of the UVM 240 drops to zero, the power supply 280 will be disabled. Once the input voltage $V_{in}$ rises above the reference voltage, the power supply 280 will be reactivated.

Figure 3:
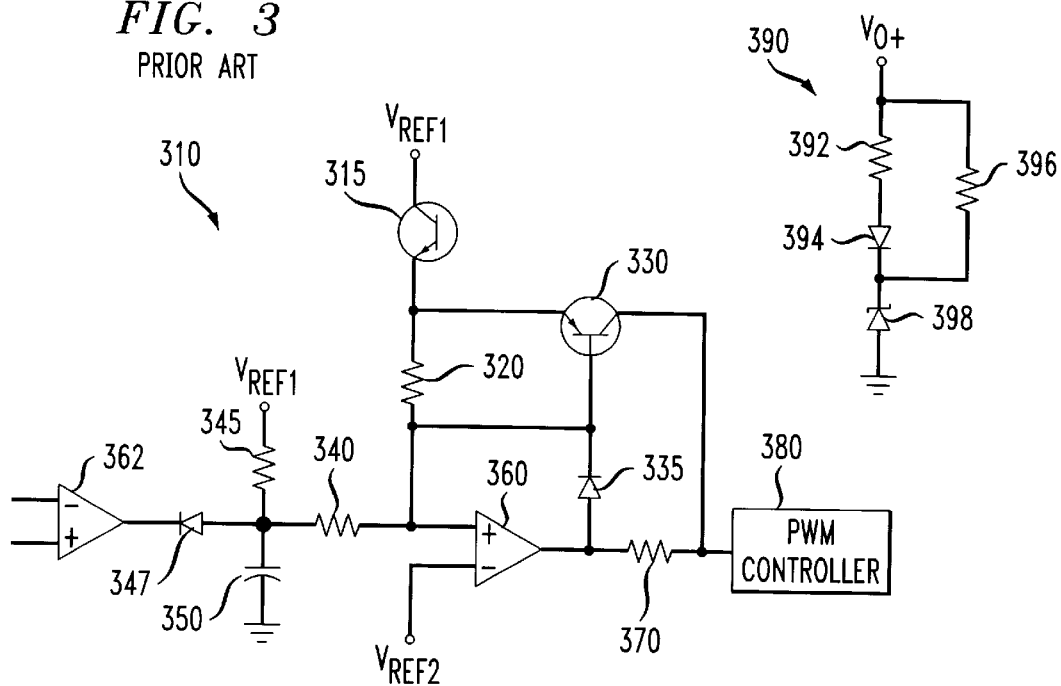
FIG. 3 illustrates a schematic diagram of a prior art overvoltage clamp circuit.

Turning now to FIG. 3, illustrated is a schematic diagram of a prior art overvoltage clamp circuit 300. The clamp circuit 300 consists of two stages, a control stage 310 and a clamping stage 390. The control stage consists of a first opto-transistor 315 coupled to a first resistor 320 which in turn is coupled to a noninverting input of an first operation amplifier 360. A second transistor 330 is coupled to the first opto-transistor 315 and is additionally coupled to the noninverting input of the first operational amplifier 360 and to a second resistor 370 which is further coupled to the output of the first operational amplifier 360. Further, a supply PWM controller 380 is coupled to the second resistor 370. A first diode 335 is coupled between the first operational amplifier's 360 output and noninverting input, forming a positive feedback loop. Additionally, a capacitor 350 is series-coupled to a third resistor 340 that is coupled to the noninverting input of the first operational amplifier 360. A first reference voltage $V_{ref1}$ is derived from a reference resistor 345 which is coupled to the third resistor 340. A second reference voltage $V_{ref2}$ is measured at the inverting input of the first operation amplifier 360. The output of a second operational amplifier 362 is coupled to second diode 347 which is in turn coupled to the third resistor 340.

The clamping stage 390 of the circuit 300 consists of a clamping resistor 392 series-coupled to a clamping diode 394 which is further coupled to a zener diode 398. A feedback resistor 396 is additionally coupled in parallel across a clamping resistor 392 and the clamping diode 394.

The clamping stage functions to clamp the output of a power supply (not shown), coupled thereto, when an output voltage $V_{o+}$ reaches a predesignated level. Once the output is clamped, the control stage, sensing the clamped output, signals the PWM controller 380 to shut down the power supply and keep it latched-off until the fault condition is removed and the input voltage is reapplied.

When the output voltage $V_{o+}$ is higher than the zener diode 398 voltage, the zener diode 398 starts to conduct and the clamping diode 394 also conducts. When conducting, the clamping diode 394 will transmit light to the first opto-transistor 315 that will conduct a current. A voltage source (not shown) will charge the capacitor 350 and once the capacitor's 350 voltage charges up and the first operational amplifier's noninverting input voltage is higher than the second reference voltage $V_{ref2}$, the first operational amplifier's output will by high. If the PWM controller 380 senses a voltage higher than 1 V, the controller 380 will shut off and latch-off the power supply.

Figure 4:
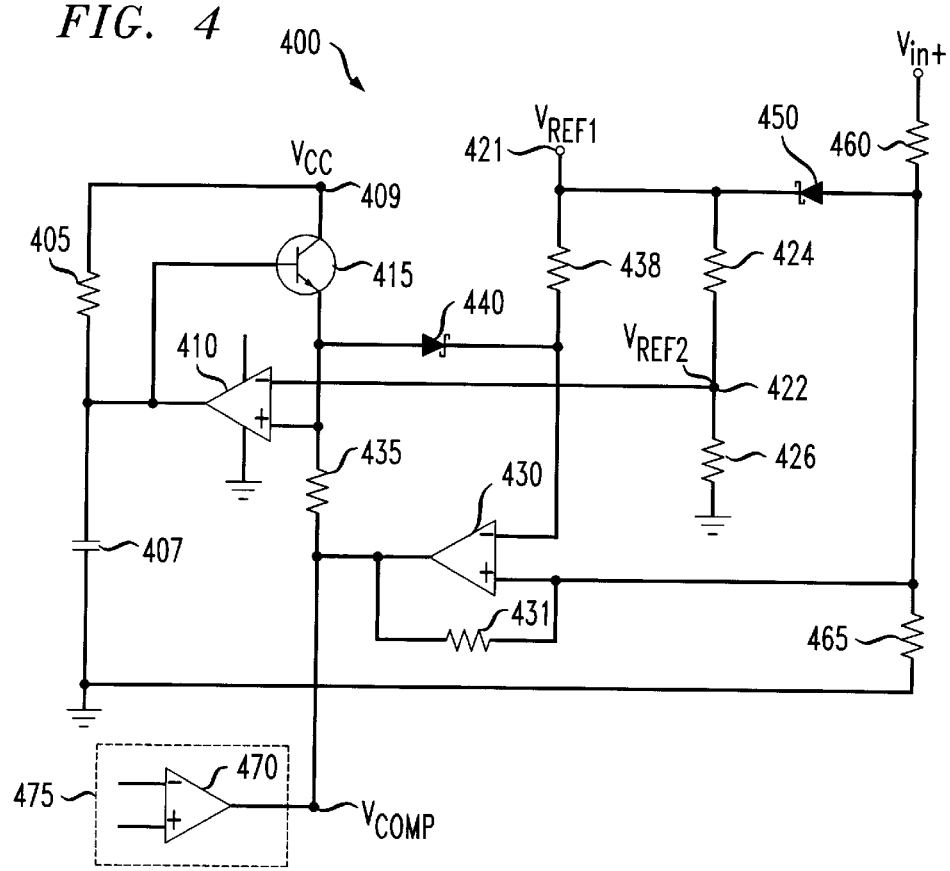
FIG. 4 illustrates a schematic diagram of an embodiment of an integrated protection circuit constructed according to the principles of the present invention.

Turning now to FIG. 4, illustrated is a schematic diagram of an embodiment of an integrated protection circuit 400 constructed according to the principles of the present invention. The protection circuit 400 consists of a first resistor 405 coupled between a capacitor 407 and a transistor 415. A supply voltage $V_{cc}$ is measured at node 409, between the first resistor 405 and the transistor 415. The transistor 415 is further coupled between the noninverting input and the output of a first comparator 410 (e.g., an operational amplifier) forming a positive feedback loop. First and second divider resistors 424, 426 are coupled to the inverting input of the first comparator 410 from a node 422. A primary reference voltage $V_{ref1}$, measured at node 421, is reduced by the series-coupled first and second divider resistors 424, 426 to generate a second reference voltage $V_{ref2}$ at node 422.

A second resistor 435 is coupled between the output of a second comparator 430 (e.g., an operational amplifier) and the noninverting input of the first comparator 410. The second resistor 435 is additionally coupled to the output of a controller operational amplifier 470 that is located in a controller (e.g., a PWM controller IC) 475. A third resistor 438 is coupled between the inverting input of the second comparator 430 and the primary reference voltage $V_{ref1}$. A fourth resistor 460 is coupled to the noninverting input of the second comparator 430 and the fifth resistor 465 is coupled between the second comparator's 430 noninverting input and the capacitor 407. Lastly, a feeback resistor 431 is coupled across the second comparator 430 between the output and the noninverting input.

The protection circuit also includes an isolation circuit consisting of a first diode 440. The first diode 440 is coupled between the transistor 415 and the inverting input of the second comparator 430. The undervoltage lockout and overcurrent protection functions are embodied, in part, in the isolation circuit (e.g., first diode 440), a sensor (e.g., a resistor divider network including third and fourth resistors 460, 465) and a fifth resistor 438 in connection with the network of first and second comparators 410, 430. In addition to providing overcurrent protection, the integrated protection circuit senses an input voltage of a power converter with the resistor divider network and compares the input voltage with a primary reference voltage $V_{ref1}$. The second comparator's 430 output will be nearly zero and the output voltage of the control operational amplifier 470 will be likewise reduced, causing the power converter to shut down when the sensed input voltage $V_{in}$ is lower than the primary reference voltage $V_{ref1}$. Once the sensed input voltage $V_{in}$ rises above the primary reference voltage $V_{ref1}$, the output of the second comparator 430 will be high and the controller 475 will be enabled. Further, those skilled in the art will recognize that the feedback resistor 431 can be used for hysteresis.

The first diode 440 acts as an isolation circuit which allows the inverted input of the second comparator 430 to act as a reference voltage for the undervoltage lockout function while the overcurrent protection is inactive (by selectively decoupling the first comparator 410 from said controller 475). The first diode 440 also allows for positive feedback required for overcurrent latching when the output of the first comparator 410 goes high.

A controller output voltage $V_{comp}$, which is proportional to the peak current, thereby controlling the power supply output, normally operates between 1 V to 4 V. A power supply coupled to the PWM controller 475 is operated in a peak current control mode of operation whereby the PWM controller 475 regulates the output voltage of the power supply from light load to full load current. If an overcurrent condition that exceeds a predetermined threshold exists, the output voltage falls out of regulation and the output of the controller operational amplifier 470 will saturate high (approximately 5 V) and shut off the unit. Additionally, those skilled in the art will understand that this embodiment works with other forms of circuit control (e.g. duty cycle control) where the controlled parameter is a function of the control signal, $V_{comp}$.

A second diode 450 is coupled between the noninverting input of the second comparator 430 and the first divider resistor 424 and acts as a voltage clamp. When the voltage at the first operational amplifier's 430 noninverting input increases to a value possibly higher than the supply voltage $V_{cc}$, the second diode 450 clamps the voltage at the noninverting input. This may not be necessary if the supply voltage $V_{cc}$ is always adequately higher than the voltage at the noninverting input.

Figure 5:
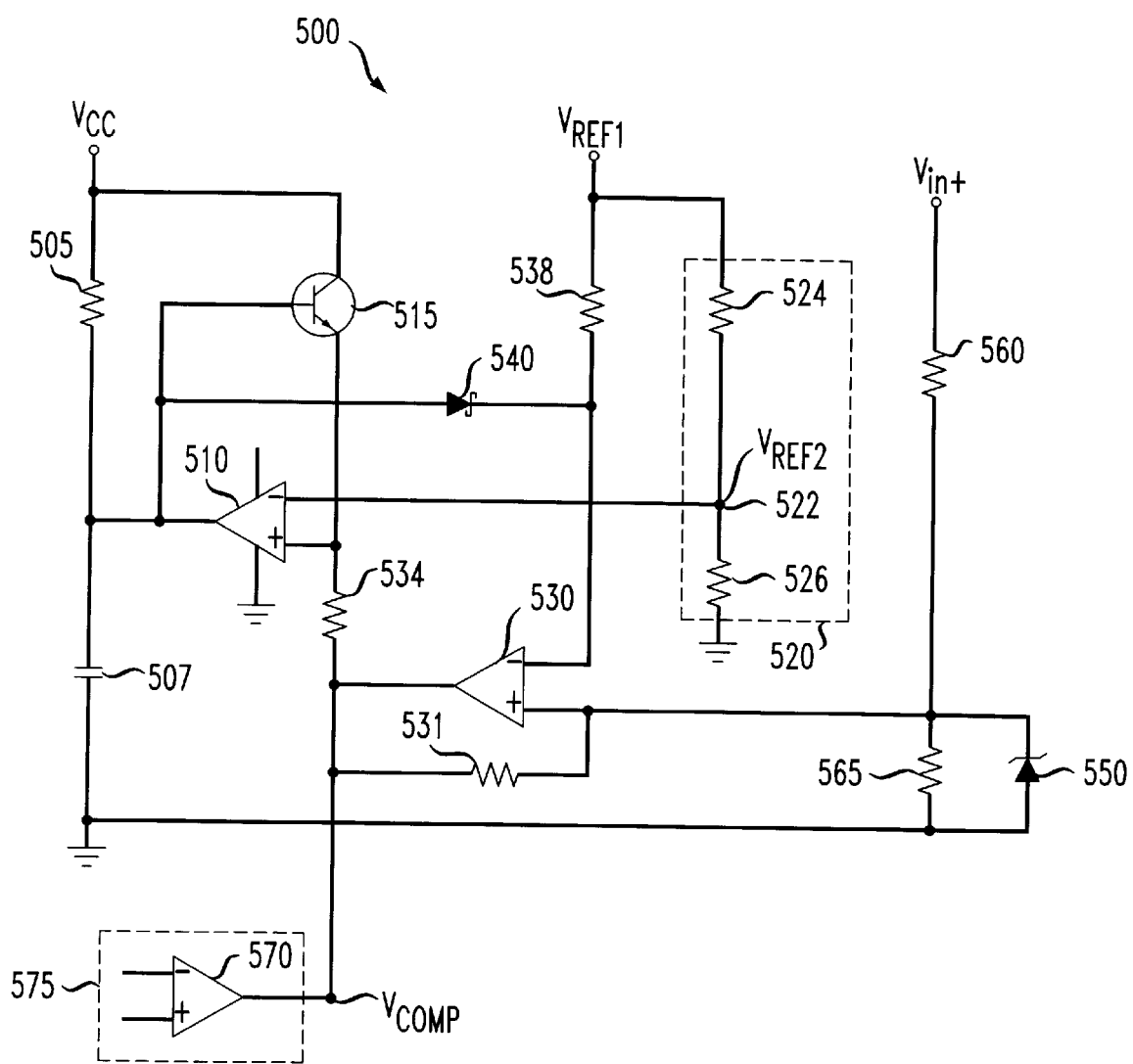
FIG. 5 illustrates a schematic diagram of a second embodiment of an integrated protection circuit constructed according to the principles of the present invention.

Turning now to FIG. 5, with continued reference to FIG. 4, illustrated is a schematic diagram of a second embodiment of a protection circuit constructed according to the principles of the present invention that operates analogously to the embodiment shown in FIG. 4. The protection circuit 500 consists of a first resistor 505 coupled between a capacitor 507 and a transistor 515. The transistor 515 is further coupled between the noninverting input and the output of a first comparator 510 (e.g., an operational amplifier) forming a positive feedback loop. First and second divider resistors 524, 526 are coupled to the inverting input of the first comparator 510 from a node 522. A second reference voltage $V_{ref2}$ is sensed from the node 522 located between the series-coupled first and second divider resistors 524, 526.

A second resistor 535 is coupled between the output of a second comparator 530 (e.g., an operational amplifier) and the noninverting input of the first comparator 510. The second resistor 535 is additionally coupled to the output of a controller operational amplifier 570 that is located in a controller (e.g., a PWM controller IC) 575. A third resistor 538 is coupled between the inverting input of the second comparator and the first divider resistor 524. A fourth resistor 560 is coupled to the noninverting input of the second comparator 530 and the fifth resistor 565 is coupled between the second comparator's 530 noninverting input and the capacitor 507. Lastly, a feeback resistor 531 is coupled across the second comparator 530 between the output and the noninverting input.

The integrated protection circuit also includes an isolation circuit consisting of first and second diodes 540, 550. The first diode 540 is coupled between the first comparator's 510 output and the inverting input of the second comparator 530. The zener diode 550 is coupled between the capacitor 507 and the noninverting input of the second comparator 530.

In addition to the advantages of the integrated protection circuit of FIG. 4, the integrated protection circuit 500 of FIG. 5 utilizes the zener diode 550 that acts to clamp the sensed input voltage $V_{in}$. Also, the first diode 540 is connected to the output of first comparator 510, functioning as an alternative means of coupling and decoupling the interaction of the first and second comparators 510, 530.

The embodiments of the integrated protection circuits described with respect to FIGS. 4 and 5 may also employ a voltage clamp (e.g.,an output diode) which is placed across the output of the power converter to clamp the output voltage, as part of an overvoltage clamp circuit function. The output diode will clamp the output voltage and the unit will be in an overcurrent condition. Once the integrated protection circuit senses the overcurrent condition, the circuit signals the controller to disable the power converter until the overvoltage occurrence is remedied.

Figure 6:
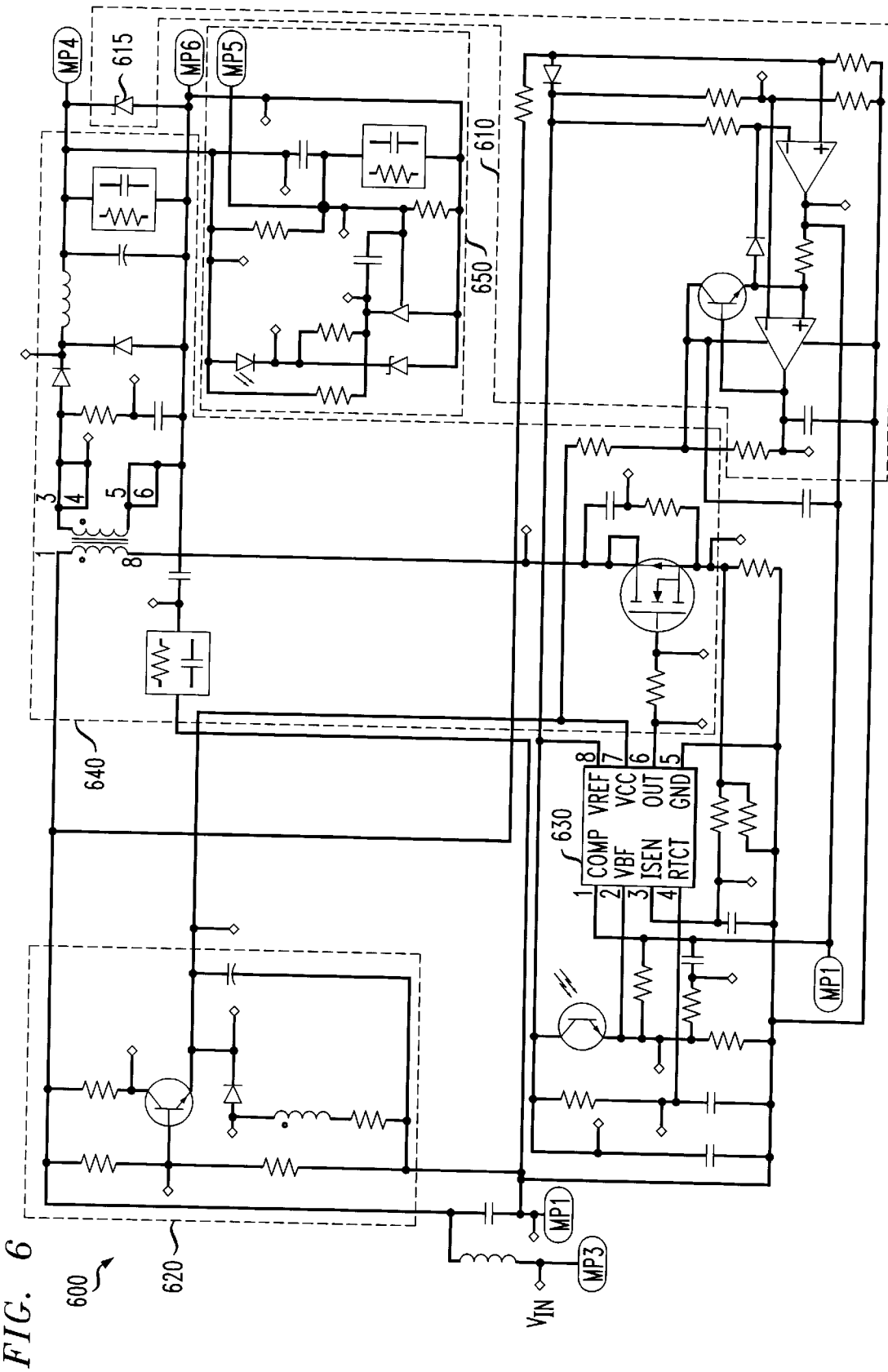
FIG. 6 illustrates a schematic of a power supply employing an integrated protection circuit constructed according to the principles of the present invention.

Turning now to FIG. 6, illustrated is a schematic of a power supply 600 employing an integrated protection circuit constructed according to the principles of the present invention. The power supply 600 employs an integrated overcurrent, undervoltage and overvoltage protection circuit 610 constructed according to the principles of the present invention. This protection circuit 610 includes an output clamping diode 615. The output clamping diode 615 clamps the output voltage, not allowing the output to rise above a desired level and consequently, the unit operates in an overcurrent condition. The protection circuit 610 senses the overcurrent condition and signals a peak current controller 630 (e.g., manufacturer model number UC3845, by Motorola, Inc, of Phoenix, Ariz.) that then disables the power supply 600. Along with the protection circuit 610, the power supply 600 further consists of a start-up circuit 620, a forward converter 640 with resonant reset and a feedback loop controller 650. This figure illustrates an embodiment of the present invention in working combination with other conventional circuits in the power supply 600. Those skilled in the art will recognize the operations of the conventional circuits and their interaction with each other and with the present invention.

As in most circuits and power supplies, a calculatable output is desired. The minimum input voltage required to maintain the output voltage within chosen parameters is calculated as follows:

$$V_{inmin}=(V_o+V_d)/(n*D_{max})$$

where: $V_o$ is the output voltage, $V_d$ is the output diode voltage drop, $V_{in}$ is the input voltage, n is the transformer turns-ratio and $D_{max}$ is the maximum duty cycle limit. The converter 640 start-up voltage depends on the controller 630 start-up threshold voltage combined with the start-up circuitry 620. The controller 630 has an internal lockout function to prevent turn-on until a certain threshold voltage is reached. As the input voltage to the power supply 600 rises, a fraction of the input voltage is applied to the controller 630 by the start-up circuitry 620 and the converter 640 will start when threshold voltage is reached. This input threshold voltage is referred to as $V_{inturnon}$.

The undervoltage lockout voltage $V_{inuv}$ can be set higher than the minimum input voltage $V_{inmin}$ but lower than the input threshold voltage $V_{inturnon}$, which can be expressed as the following:

$$V_{inturnon}>V_{inuv}>V_{inmin}$$

where: $V_{inturnon}$ is the input voltage corresponding to the controller turn-on threshold voltage, $V_{inmin}$ is the input voltage corresponding to minimum voltage which keeps the output voltage within the desired boundaries, and $V_{inuv}$ is the input voltage corresponding at which the undervoltage lockout circuit will turn the power supply 600 on or off.

Utilizing the undervoltage lockout function, the power supply 600 stays in the off-state when the input voltage is below $V_{inuv}$, turns on at $V_{inturnon}$ and turns off below $V_{inuv}$. Therefore, the power supply 600 can turn-on and turn-off properly with the undervoltage lockout function in the circuit.

Exemplary embodiments of the present invention have been illustrated above with reference to specific electronic components. Those skilled in the art are aware, however, that components may be substituted (not necessarily with components of the same type) to create desired conditions or accomplish desired results. For instance, multiple components may be substituted for a single component and vice-versa. Similarly, although the power transformers having a single core and a single primary winding has been illustrated, other power train topologies may be used to accomplish essentially the same results disclosed by the present invention. Finally, those skilled in the art are aware that even though only one type of power converter was referenced above, other converter topologies including, without limitation, a push-push converter, a buck converter and a flyback converter, are also within the broad scope of the present invention,.

For a better understanding of power electronics, power converter topologies, such as forward power converters, and control circuits, see: *Principles of Power Electronics*, by J. Kassakian and M. Schlecht, Addison-Wesley Publishing Company (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a controller, couplable to network of first and second comparators, that disables a power converter when an actual output current thereof exceeds a threshold output current, an integrated protection circuit, comprising:
   a sensor that senses an actual input voltage of said power converter; and
   an isolation circuit that selectively decouples said first comparator from said second comparator, said second comparator causing said controller to disable said power converter when said actual input voltage falls below a threshold input voltage thereby allowing said protection circuit to provide both overcurrent and undervoltage protection.

2. The protection circuit as recited in claim 1 further comprising a voltage clamp that temporarily clamps an output voltage of said power converter at an upper limit, said protection circuit subsequently causing said controller to disable said power converter.

3. The protection circuit as recited in claim 1 wherein said threshold input voltage is partially derived from a reference voltage coupled through a resistor to an input of said second comparator.

4. The protection circuit as recited in claim 1 wherein said sensor comprises a resistor divider network.

5. The protection circuit as recited in claim 1 further comprising a clamp circuit capable of clamping a voltage at an input of said second comparator.

6. The protection circuit as recited in claim 1 wherein said isolation circuit comprises a diode.

7. The protection circuit as recited in claim 1 wherein said network further comprises a capacitor and a switch.

8. For use with a controller, couplable to a network of first and second comparators, that disables a power converter when an actual output current thereof exceeds a threshold output current, a method of providing both overcurrent and undervoltage protection in an integrated protection circuit, comprising the steps of:
   sensing an actual input voltage of said power converter with a sensor;
   selectively decoupling said first comparator from said second comparator; and
   causing said controller to disable said power converter with said second comparator when said actual input voltage falls below a threshold input voltage thereby allowing said protection circuit to provide both overcurrent and undervoltage protection.

9. The method as recited in claim 8 further comprising the step of temporarily clamping an output voltage of said power converter at an upper limit before carrying out said step of causing.

10. The method as recited in claim 8 further comprising the step of partially deriving said threshold input voltage from a reference voltage coupled through a resistor to an input of said second comparator.

11. The method as recited in claim 8 wherein said sensor comprises a resistor divider network.

12. The method as recited in claim 8 further comprising the step of temporarily clamping a voltage applied to an input of said second comparator.

13. The method as recited in claim 8 wherein said isolation circuit comprises a diode.

14. The method as recited in claim 8 wherein said network further comprises a capacitor and a switch.

15. A DC/DC power supply, comprising:
   a power converter having a power switch;
   a controller, coupled to said power switch, that disables said power switch when an actual output current of said power converter exceeds a threshold output current;
   a network of first and second comparators coupled to said controller; and
   an integrated protection circuit, including:
      a sensor that senses an actual input voltage of said power converter, and
      an isolation circuit, coupled to said first comparator, that selectively decouples said first comparator from said second comparator, said second comparator causing said controller to disable said power converter when said actual input voltage falls below a threshold input voltage thereby allowing said protection circuit to provide both overcurrent and undervoltage protection.

16. The DC/DC power supply as recited in claim 15 wherein said protection circuit further comprises a voltage clamp that temporarily clamps an output voltage of said power converter at an upper limit, said protection circuit subsequently causing said controller to disable said power supply.

17. The DC/DC power supply as recited in claim 15 wherein said threshold input voltage is partially derived from a reference voltage coupled through a resistor to an input of said second comparator.

18. The DC/DC power supply as recited in claim 15 wherein said sensor comprises a resistor divider network.

19. The DC/DC power supply as recited in claim 15 further comprising a clamp circuit capable of clamping a voltage at an input of said second comparator.

20. The DC/DC power supply as recited in claim 15 wherein said isolation circuit comprises a diode.

21. The DC/DC power supply as recited in claim 15 wherein said network further comprises a capacitor and a switch.

* * * * *